(12) United States Patent
Satori

(10) Patent No.: US 6,847,554 B2
(45) Date of Patent: Jan. 25, 2005

(54) NONVOLATILE SEMICONDUCTOR MEMORY DEVICE WITH ERROR DETECTION AND CORRECTION CIRCUIT

(75) Inventor: Kenichi Satori, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/630,799

(22) Filed: Jul. 31, 2003

(65) Prior Publication Data
US 2004/0022087 A1 Feb. 5, 2004

(30) Foreign Application Priority Data
Aug. 2, 2002 (JP) ..................................... P2002-226603

(51) Int. Cl.[7] .......................... G11C 29/00; H03M 13/15
(52) U.S. Cl. ............................. 365/185.09; 365/185.29; 365/185.33; 714/800; 714/819; 714/758; 714/782; 714/784
(58) Field of Search ....................... 365/185.09, 185.29, 365/185.33; 714/800, 801, 802, 819, 824, 758, 773, 782, 784

(56) References Cited
U.S. PATENT DOCUMENTS 6,111,807 A * 8/2000 Ooishi ................... 365/230.01
6,259,647 B1 * 7/2001 Ooishi ................... 365/230.01
6,396,768 B2 * 5/2002 Ooishi ......................... 365/233

* cited by examiner

Primary Examiner—Andrew Q. Tran
(74) Attorney, Agent, or Firm—Rader, Fishman & Grauer PLLC; Ronald P. Kananen

(57) ABSTRACT

A semiconductor memory device for error correction encoding and decoding able to avoid erroneous judgment occurring due to erroneous correction when a nonvolatile memory is in a predetermined initial state, wherein, at the time of writing, write data and predetermined status data, for example, erasure data when the nonvolatile memory is in an erasure state are compared and, when the result of the comparison is that the write data coincides with the erasure data, the erasure data is selected and, conversely when they do not coincide, the encoded data obtained by error correction encoding the write data is selected and written into the nonvolatile memory, while at the time of reading, when the result of the comparison between the read data and the erasure data from the nonvolatile memory is that the read data coincides with the erasure data, the erasure data is selected and, conversely when they do not coincide, the decoded data obtained by error correction decoding the read data is selected and output.

7 Claims, 8 Drawing Sheets

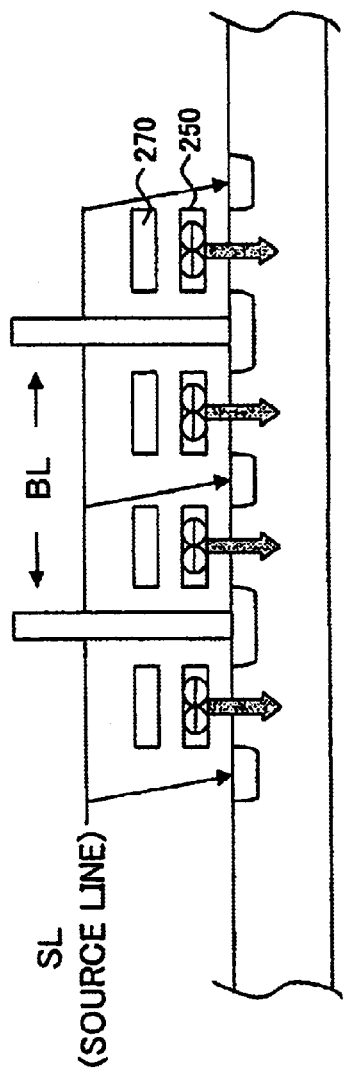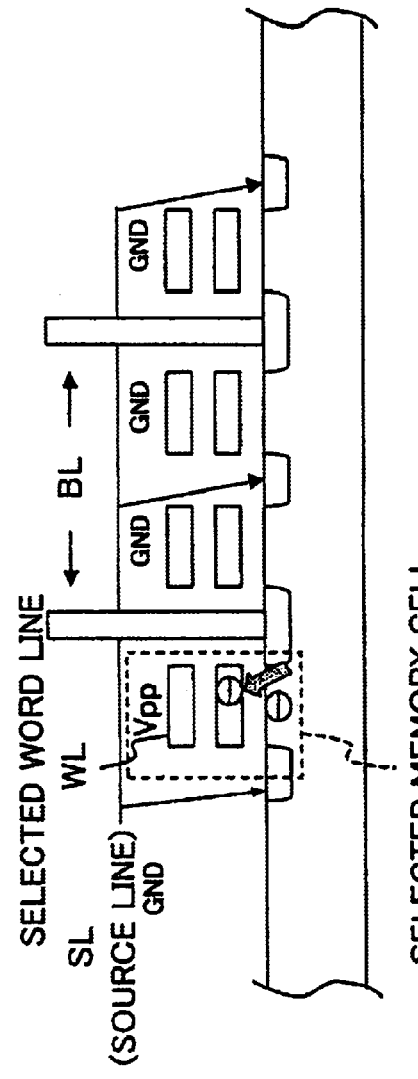
FIG. 4A
FIG. 4B

NONVOLATILE SEMICONDUCTOR MEMORY DEVICE WITH ERROR DETECTION AND CORRECTION CIRCUIT

BACKGROUND OF THE INVENTION

1. Field of the Invention

The present invention relates to a semiconductor memory device, for example, a semiconductor memory device for storing encoded data obtained by encoding input data for error connection at the time of writing in a nonvolatile memory and error correction decoding the data read from the nonvolatile memory at the time of reading.

2. Description of the Related Art

In a nonvolatile memory device storing data using a nonvolatile memory, to secure reliability of the storage data, error detection and error correction are carried out at the time of reading. For this reason, the input data is encoded for the error detection and the error correction before writing it into the nonvolatile memory.

The encoding system used in the error correction encoding includes for example Reed Solomon encoding, BCH encoding, etc. These error correction encoding systems encode the input data and generate error correction codes. The error correction codes are then stored by the nonvolatile memory. At the time of reading, the error correction encoded data is read from the nonvolatile memory. The original data is restored by decoding corresponding to the error correction encoding based on the read data.

By the above encoding and decoding, for example, even if an error occurs at the time of, for example, the writing or reading with respect to the nonvolatile memory, this error is corrected by the decoding, so the input data can be correctly restored and the reliability of the nonvolatile memory device can be enhanced.

Summarizing the problem to be solved by the invention, in the encoding and decoding using the above conventional nonvolatile memory, when the data read from the nonvolatile memory after erasure all becomes "1", the error correction encoding bits are not all "1". This means that an error detection/correction circuit for performing the error detection and the error correction outputs a judgment result "there is error" when reading data from the nonvolatile memory that is finished being erased.

Further, when the data is written as all "1" at the time of writing, the encoding bits for the error detection/error correction are not "1"; therefore, even bits which originally should not be written have to be written by making the error correction encoding bits "0". Namely, when the nonvolatile memory is in a certain specific initial state, for example, an erasure state, all memory cells of the nonvolatile memory are held at a constant state, so all of the storage data of the nonvolatile memory becomes a constant value, for example "1". In this case, when error correction decoding data is read from the nonvolatile memory, a judgment result that there is an error is obtained, so there is the disadvantage that the original state of the data stored in the nonvolatile memory can no longer be correctly represented.

SUMMARY OF THE INVENTION

An object of the present invention is to provide a semiconductor memory device for error correction encoding and decoding write and read data of a nonvolatile memory and able to avoid erroneous judgment occurring due to the error detection when the nonvolatile memory is in a predetermined initial state.

To attain the above object, according to a first aspect of the present invention, there is provided a semiconductor memory device comprising an encoding means for encoding input data according to a predetermined error correction encoding system; a comparing means for comparing the input data and a predetermined status data; a selecting means for selecting either of the input data or encoded data output from the encoding means in accordance with a comparison result of the comparing means; and a nonvolatile memory for storing data selected by the selecting means, wherein the nonvolatile memory holds the status data in a predetermined initialization state.

Preferably, the nonvolatile memory holds the status data in the erasure state.

Preferably, the selecting means selects the status data when the input data coincides with the status data and selects the encoded data output from the encoding means when the input data does not coincide with the status data.

According to a second aspect of the invention, there is provided a semiconductor memory device comprising a decoding means for decoding data read from a nonvolatile memory according to a predetermined error correction decoding system; a comparing means for comparing data input to the decoding means and predetermined status data; and a selecting means for selecting either of the status data or decoded data output from the decoding means in accordance with a comparison result of the comparing means, wherein the nonvolatile memory holds the status data in a predetermined initialization state.

Preferably, the selecting means selects the status data when the read data coincides with the status data and selects the decoded data when the read data does not coincide with the status data.

According to a third aspect of the present invention, there is provided a semiconductor memory device for error correction encoding/decoding input/output data, comprising an encoding means for encoding input data according to a predetermined error correction encoding system; a comparing means for comparing the input data and predetermined status data; a first selecting means for selecting either of the input data or encoded data output from the encoding means in accordance with a comparison result of the comparing means; a nonvolatile memory for storing data selected by the selecting means; a decoding means for decoding data read from the nonvolatile memory according to a predetermined error correction decoding system; a comparing means for comparing the decoded data output by the decoding means and the status data; and a second selecting means for selecting either of the status data or the decoded data in accordance with the comparison result of the comparing means, wherein the nonvolatile memory holds the status data in a predetermined initialization state.

According to the present invention, at the time of writing, write data and predetermined status data, for example erasure data at the time of the erasure state of the nonvolatile memory, are compared. In accordance with the result of the comparison, when the write data coincides with the erasure data, the erasure data is selected, and conversely when they do not coincide, the encoded data obtained by error correction encoding the write data is selected and written into the nonvolatile memory. At the time of reading, in accordance with the comparison result between the read data and the erasure data from the nonvolatile memory, when the read data coincides with the erasure data, the erasure data is selected, and conversely when they do not coincide, the decoded data obtained by error correction decoding the read data is selected and output. By this, occurrence of an erroneous decision of the error correction in write data completely coinciding with the erasure data is avoided.

BRIEF DESCRIPTION OF THE DRAWINGS

These and other objects and features of the present invention will become clearer from the following description of the preferred embodiments given with reference to the attached drawings, wherein:

FIGS. 4A and 4B are conceptual views of the erase and write operation of a NOR type nonvolatile memory;

DESCRIPTION OF THE PREFERRED EMBODIMENTS

Preferred embodiments of the present invention will be described in detail below while referring to the attached figures.

Figure 1:
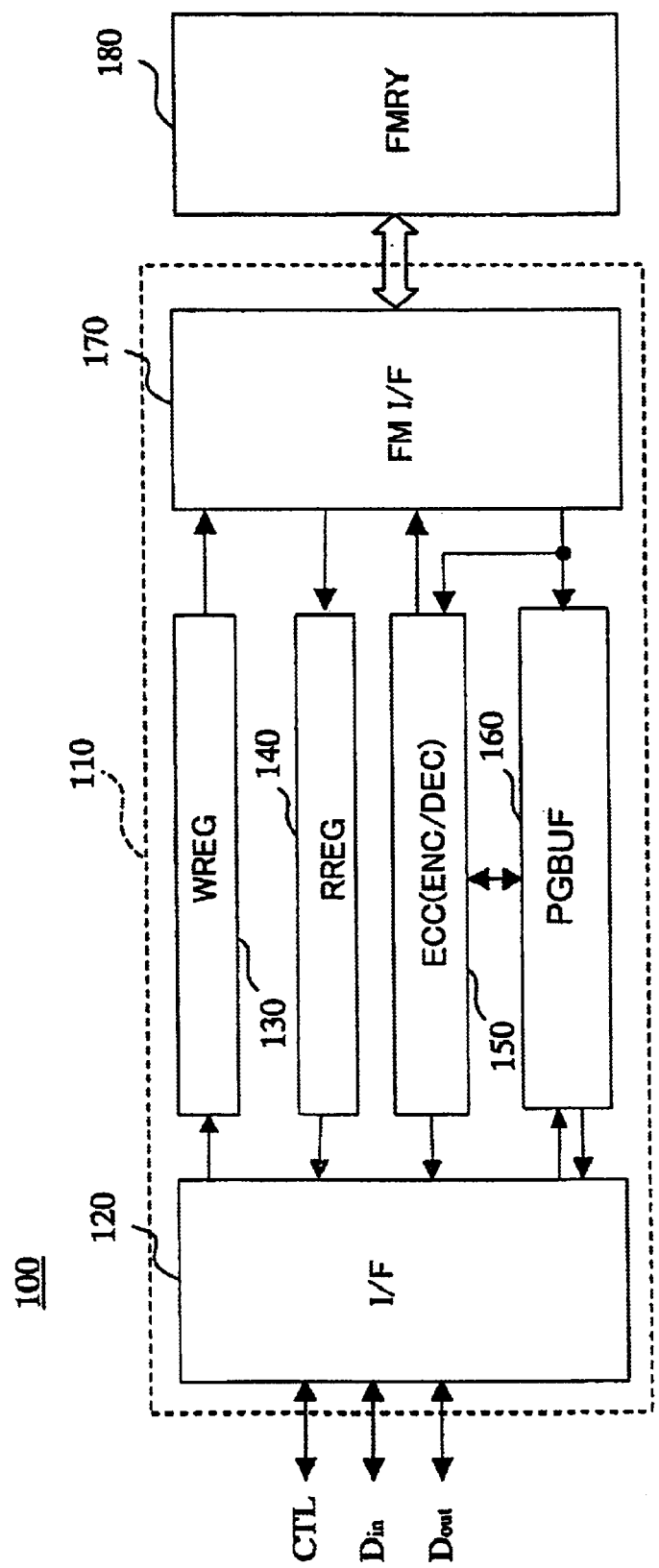
FIG. 1 is a view of the configuration of an embodiment of a semiconductor memory device according to the present invention.

FIG. 1 is a view of the configuration of an embodiment of a semiconductor memory device according to the present invention. As illustrated, a semiconductor memory device 100 of the present embodiment is configured by a control unit and a memory unit. The memory unit is configured by a nonvolatile memory, for example, a so-called flash memory (FMRY) 180 erasing data in units of blocks or the chip unit. A control unit 110 is configured by a partial circuit for realizing an error detection/correction function, an interface for input/output of the data, and a buffer (register) for temporarily storing the input/output data, etc. Note that the semiconductor memory device of the present embodiment can be used to form a portable type memory device having an information storage function using a flash memory, for example, a memory card. Other than this, it is also possible to form part of, for example, a so-called IC card for achieving a certain specific function by adding predetermined processing to memory information other than information storage.

As shown in FIG. 1, in the semiconductor memory device 100 of the present embodiment, the control unit 110 is configured by an interface unit (I/F) 120, a write register (WREG) 130, a read register (RREG) 140, an error correction circuit (ECC) (ENC/DEC circuit) 150, a page buffer (PGBUF) 160, and a flash memory interface (FM I/F) 170. Below, an explanation will be given of components of the control unit 110.

The interface unit 120 holds a control signal CTL and write data $D_{in}$ input from the outside and outputs the same to other partial circuits of the control unit 110. Further, the interface unit 120 holds the control signal from the control unit 110 and read data $D_{out}$ and outputs the same to the outside.

The write register 130 stores the control data for controlling the writing and control commands input from the interface unit 120 and outputs the stored data to the flash memory interface 170 at a predetermined timing. The read register 140 stores the control data and the control commands, etc., output from the flash memory interface 170 and outputs the same to the interface unit 120 at a predetermined timing.

The error correction circuit 150 performs the error correction encoding and decoding. When writing the data into the flash memory 180, the write data $D_{in}$ input from the outside is input via the interface unit 120 to the page buffer 160. Then, the write data $D_{in}$ is read from the page buffer 160 and input to the error correction circuit 150. The error correction circuit 150 error correction encodes the data $D_{in}$ based on the encoding system determined in advance and outputs the encoded encoding code to the flash memory interface 170.

On the other hand, when reading the storage data from the flash memory 180, the read data is input via the flash memory interface 170 to the error correction circuit 150. The error correction circuit 150 decodes the read data corresponding to the encoding used in the encoding at the time of writing and detects and corrects the error included in the read data. Then, it inputs the data after correction to the page buffer 160.

The page buffer 160 is provided for holding the write data and the read data at the time of writing and reading. At the time of writing, it stores the write data $D_{in}$ input from the interface unit 120 and then outputs the stored data to the error correction circuit 150 or the flash memory interface 170 at a predetermined timing. At the time of reading, the page buffer 160 stores the read data output from the flash memory interface 170 or the data $D_{out}$ after the error correction output from the error correction circuit 150 and outputs the same to the interface unit 120 at a predetermined timing. By providing the page buffer 160, the timing of the data input/output can be adjusted.

Figure 2:
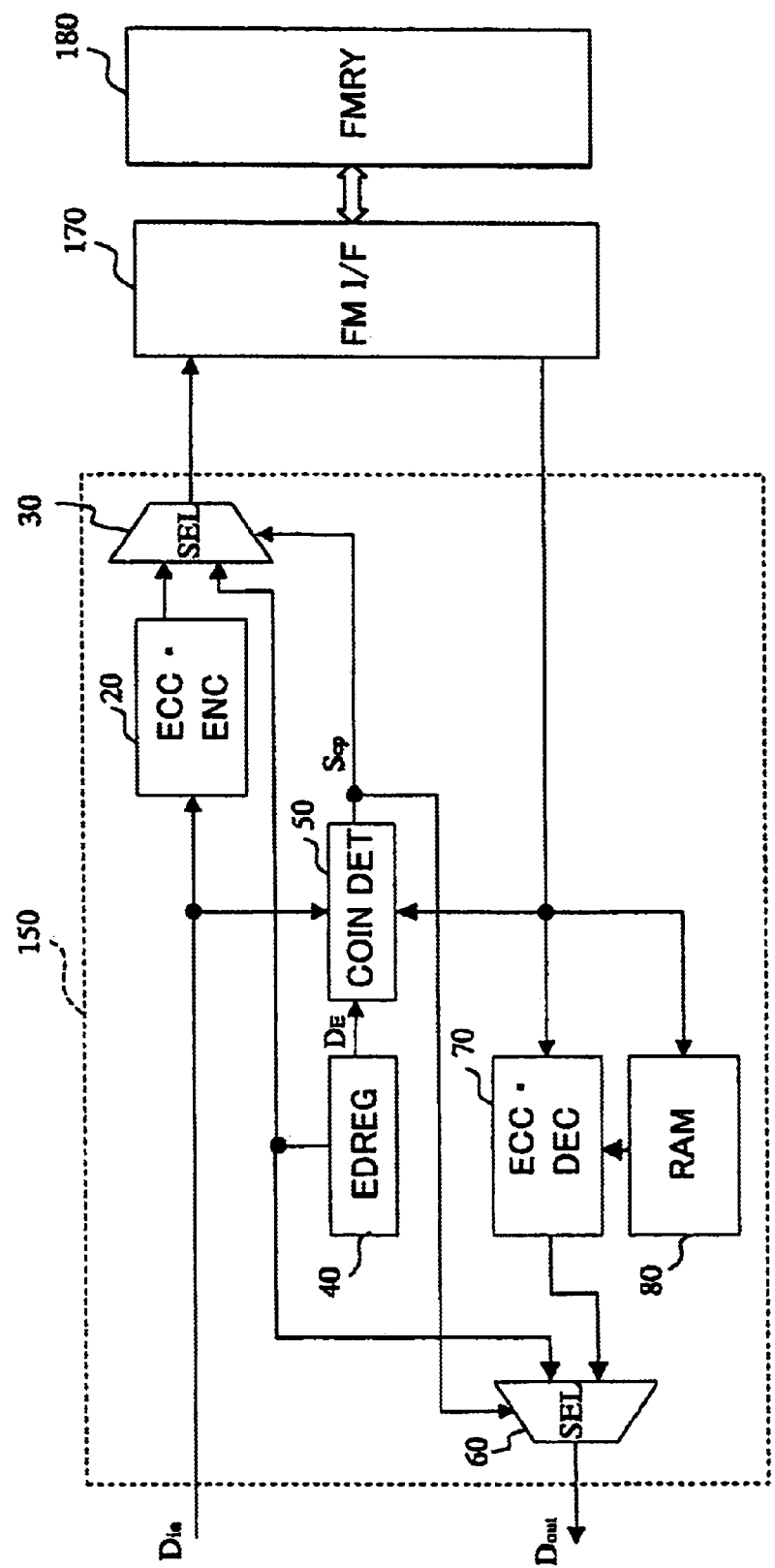
FIG. 2 is a circuit diagram of the configuration of an error correction circuit.

Next, an explanation will be given of the configuration and operation of the error correction circuit 150 in the semiconductor memory device according to the present embodiment. FIG. 2 is a view of the configuration of the partial circuit including the error correction circuit 150, the flash memory interface 170, and the flash memory 180.

As shown in FIG. 2, the error correction circuit 150 is configured by an error correction encoding circuit (EEC ENC) 20, a selection circuit (SEL) 30, an erasure data register (ED REG) 40, a coincidence detection circuit (COIN DET) 50, a selection circuit (SEL) 60, an error correction decoding circuit (ECC DEC) 70, and a RAM 80. Below, an explanation will be given of the components of the error correction circuit 150.

The ECC encoding circuit 20 error correction encodes the write data $D_{in}$ of input based on the encoding system determined in advance. The error correction codes encoded by the ECC encoding circuit 20 are output to the selection circuit 30.

The selection circuit 30 selects the error correction code output from the ECC encoding circuit 20 and the erasure data output from the erasure data register 40 in accordance with the detection result of the coincidence detection circuit 50. The data selected by the selection circuit 30 is written into the flash memory 180 via the flash memory interface 170.

The erasure data register 40 stores the storage data of each memory cell when the flash memory 180 is in the erasure state (hereinafter, this will be simply referred to as the erasure data $D_E$ for convenience) in predetermined units, for example, units of bytes or units of pluralities of bytes. Then, the erasure data register 40 supplies the stored erasure data $D_E$ to the coincidence detection circuit 50 and the selection circuits 30 and 60.

The coincidence detection circuit 50 compares the erasure data $D_E$ output from the erasure data register 40 with the write data $D_{in}$ or the read data $D_R$, outputs a comparison signal $S_{CP}$ indicating the result of comparison to the selection circuit 30 and the selection circuit 60, and controls the selection operation of these selection circuits.

The selection circuit 60 selects either of the erasure data output by the erasure data register 40 or the result of the error correction decoding output by the ECC decoding circuit 70 in accordance with the comparison signal $S_{CP}$ indicating the detection result of the coincidence detection circuit 50 and outputs the selected data as the read data $D_{out}$.

The ECC decoding circuit 70 performs reverse processing to the error correction encoding in the ECC encoding circuit 20 on the data $D_R$ read from the flash memory 180. Namely, the ECC decoding circuit 70 performs the predetermined error correction decoding on the read data $D_R$ to restore the original data.

The RAM 80 stores the read data $D_R$ output from the flash memory interface 170 and supplies the stored data $D_R$ to the ECC decoding circuit 70 at a predetermined timing. Namely, the RAM 80 functions as a buffer for temporarily holding the read data $D_R$. Using the RAM 80, the output timing of the read data $D_R$ can be adjusted.

In the present embodiment, the flash memory 180 for storing the write data erases the data in predetermined units. For example, the flash memory 180 erases data in units of blocks, in units of pages, or for the entire chip. After the erasure, the same data is held in all memory cells of the flash memory 180. The held data at this time is held in the erasure data register 40 in units of bytes or units of pluralities of bytes.

Figure 3A:
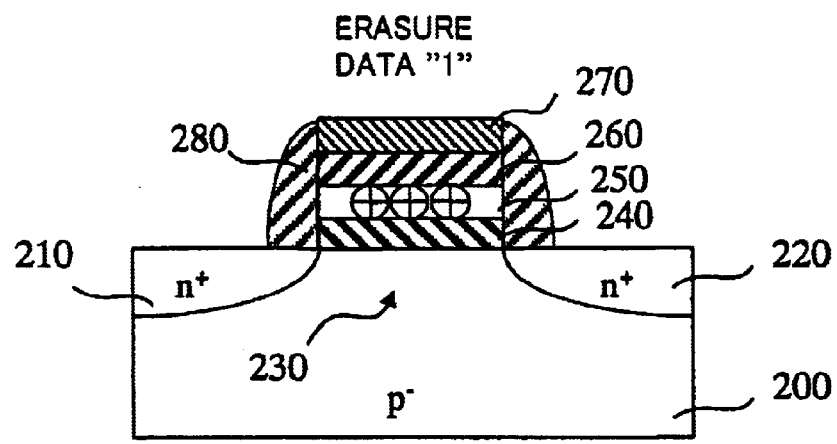
FIGS. 3A and 3B are sectional views of an example of the configuration of a nonvolatile memory cell.
Figure 3B:
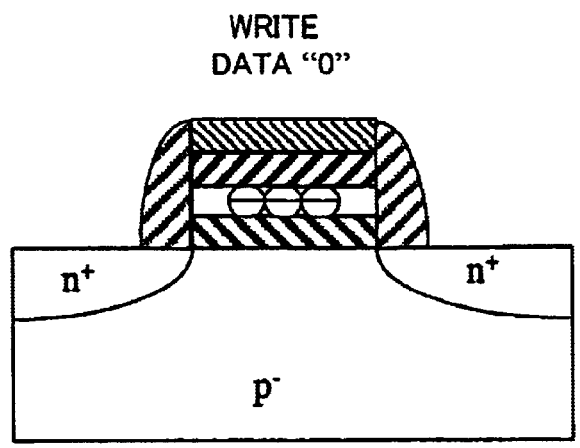

FIGS. 3A and 3B are views of the configuration of an example of a memory cell configuring the flash memory 180. As illustrated, the memory cell of the flash memory has a floating gate 250 formed on the substrate surface of a channel forming region 230 of a MOS transistor between impurity regions 210 and 220 formed on a substrate 200 via a gate insulating film 240 and further has a gate electrode 270 formed via the insulating film 260 between upper layers of the surface. Side walls 280 are formed on side surfaces of the floating gate 250 and the gate electrode 270 by an insulator. Note that the floating gate 250 is formed by a conductive material, for example, polysilicon, and the gate electrode 270 is formed by the conductive material, for example, polysilicon or a metal layer.

The floating gate of the memory cell having the above constitution is electrically insulated from its surroundings, so charges injected into the floating gate are electrically sealed in and almost permanently held. The threshold voltage of the memory cell changes in accordance with the amount of charges injected into the floating gate, so the data corresponding to this threshold voltage is stored by the memory cell. For this reason, a nonvolatile data storage able to hold the storage data even if the supply of the power source is not received can be realized.

FIG. 3A shows the memory cell in the erasure state, and FIG. 3B shows the memory cell in the writing state. As illustrated, the erasure state is the state where positive charges (+) are injected in the floating gate 250, that is, the state where electrons are drained. At this time, the threshold voltage of the memory cell becomes lower than the usual voltage. On the other hand, the writing state is the state where negative charges (electrons) are injected in the floating gate 250. At this time, the threshold voltage of the memory cell becomes higher than the usual voltage.

When defining that the data "1" corresponds to a memory cell in the erasure state and the data "0" corresponds to a memory cell in the writing state, in the case of the erasure state, on byte's worth of the storage data of the memory cell becomes "&hFF" in hexadecimal notation. Namely, all bits of one byte are held at "1".

The flash memory 180 is configured by a plurality of memory cells arranged in a matrix. Gate electrodes of the memory cells of each row are connected to the same word line, and sources or drains of the memory cells of each column are connected to the same bit line. Depending on the arrangement of the memory cells, there are the NOR type, NAND type, etc. Below, an explanation will be given of the configurations and operations of the NOR type and NAND type flash memories.

FIGS. 4A and 4B are views of the configuration of a NOR type flash memory and the erase and write operations thereof. FIG. 4A shows the operation at the time of erasing, and FIG. 4B shows the operation at the time of writing. As shown in FIGS. 4A and 4B, the NOR type flash memory has the memory cells of memory cell columns adjacent to each other connected to the same bit line BL.

As shown in FIG. 4A, at the time of erasing, a positive high voltage is applied to the substrate. Due to this, the electrons of the floating gate are drained to the substrate side, so the positive charges will accumulated in the floating gate equivalently. For this reason, the threshold voltage of the memory cell is lowered. Not that, as explained above, the storage data of the memory cell in the erasure state corresponds to "1".

The erasing of data in the memory cell explained above is carried out with respect to a plurality of memory cells together. Contrary to this, the writing of data in a memory cell is carried out with respect to an individual memory cell. When writing, the memory cell connected to both of the selected word line WL and the selected bit line BL is selected and written in.

As shown in FIG. 4B, at the time of writing, the source of the memory cell is held at a ground potential GND (0V), and a write voltage $V_{PP}$ is applied to the selected word line WL. The other unselected word lines are held at the ground potential GND. At this time, the data to be written into the selected memory cell is determined in accordance with the voltage applied to the selected bit line BL. For example, when a voltage of 0V is applied to the selected bit line (corresponding to the write data "0"), the electrons are injected into the floating gate from the channel region of the selected memory cell connected to the selected bit line BL. For this reason, the threshold voltage of the memory cell becomes high by writing. This state corresponds to the storage data "0". Further, when a positive voltage is applied to the selected bit line BL, electrons are not injected into the floating gate of the selected memory cell. For this reason, the threshold voltage of the memory cell does not change after the writing and the cell is held in the erasure state as it is. This state corresponds to the storage data "1".

Figure 5A:
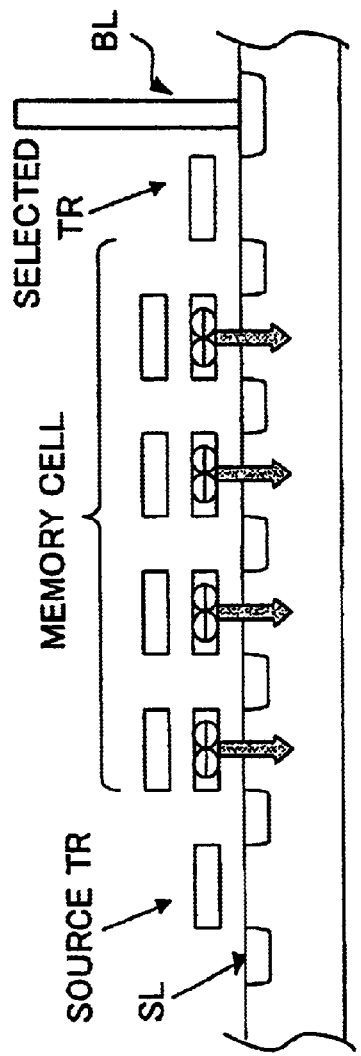
FIGS. 5A and 5B are conceptual views of the erase and write operation of a NAND type nonvolatile memory.
Figure 5B:
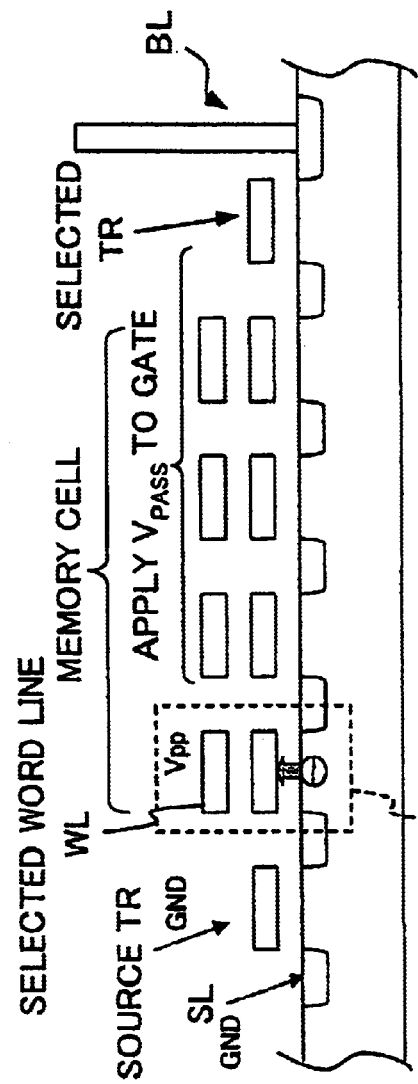

FIGS. 5A and 5B are views of the configuration of a NAND type flash memory and the erase and write operations thereof. FIG. 5A shows the operation at the time of erasing, and FIG. 5B shows the operation at the time of writing. In the NAND type flash memory as well, a plurality of memory cells are arranged in a matrix. However, unlike the NOR type flash memory, as shown in FIGS. 5A and 5B, in the NAND type flash memory, a plurality of memory cells are connected in series between the bit line BL and the source line SL.

As shown in FIG. 5A, at the time of erasing, a positive high voltage is applied to the substrate. Due to this, the electrons of the floating gate are drained to the substrate side, so positive charges will accumulate in the floating gate equivalently. For this reason, the threshold voltage of the memory cell is lowered. Note that, as explained above, the storage data of the memory cell in the erasure state corresponds to "1".

The erasing of the memory cell explained above is carried out with respect to a plurality of memory cells together. Contrary to this, the writing of a memory cell is carried out with respect to an individual memory cell. When writing, the memory cell connected to both of the selected word line WL and the selected bit line BL is selected and written in.

As shown in FIG. 5B, at the time of writing, the source line SL is held at the ground potential GND, the write voltage $V_{PP}$ is applied to the selected word line WL, and an intermediate voltage $V_{pass}$ is applied to the other word lines. At this time, the data to be written into the selected memory cell is determined in accordance with the voltage applied to the selected bit line BL. For example, when voltage of 0V is applied to the selected bit line BL, the channel region of the selected memory cell is held at 0V, so the electrons are injected into the floating gate from that channel region. For this reason, the threshold voltage of the memory cell becomes high by the writing. This state corresponds to the storage data "0".

Further, when a positive voltage is applied to the selected bit line BL, the drain region of the selected memory cell is also held at the positive voltage, so electrons are not injected into the floating gate of the selected memory cell. For this reason, the threshold voltage of the memory cell does not change after the writing and is held in the erasure state as it is. This state corresponds to the storage data "1".

As explained above, in both NOR type or NAND type flash memories, the erasure is carried out together. The data held in the memory cell after the erasing becomes "1". Namely, the storage data of the memory cell in the erasure state is "1". The writing in a NOR type or NAND type flash memory is carried out in units of memory cells. By the writing, either of the data "0" or "1" can be stored in the memory cell.

Figure 6:
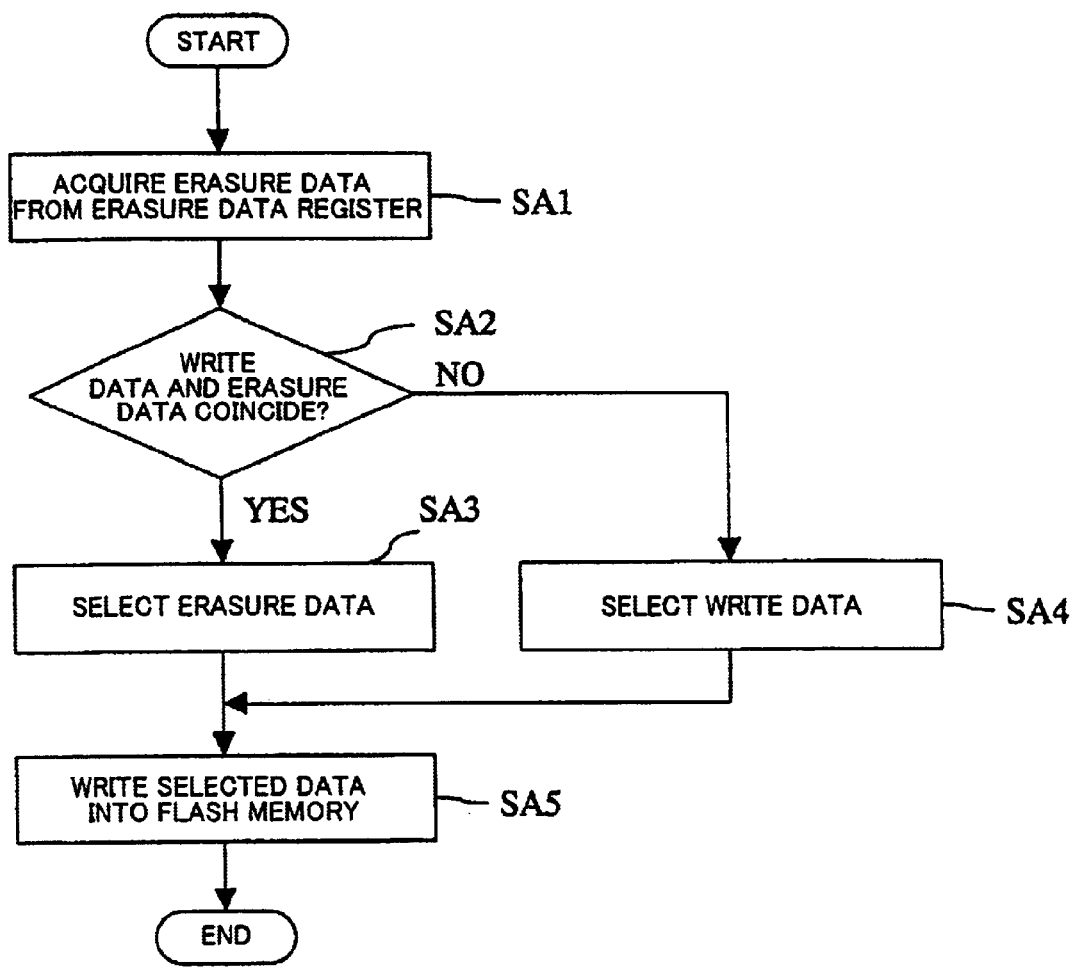
FIG. 6 is a flow chart of the operation at the time of writing.
Figure 7:
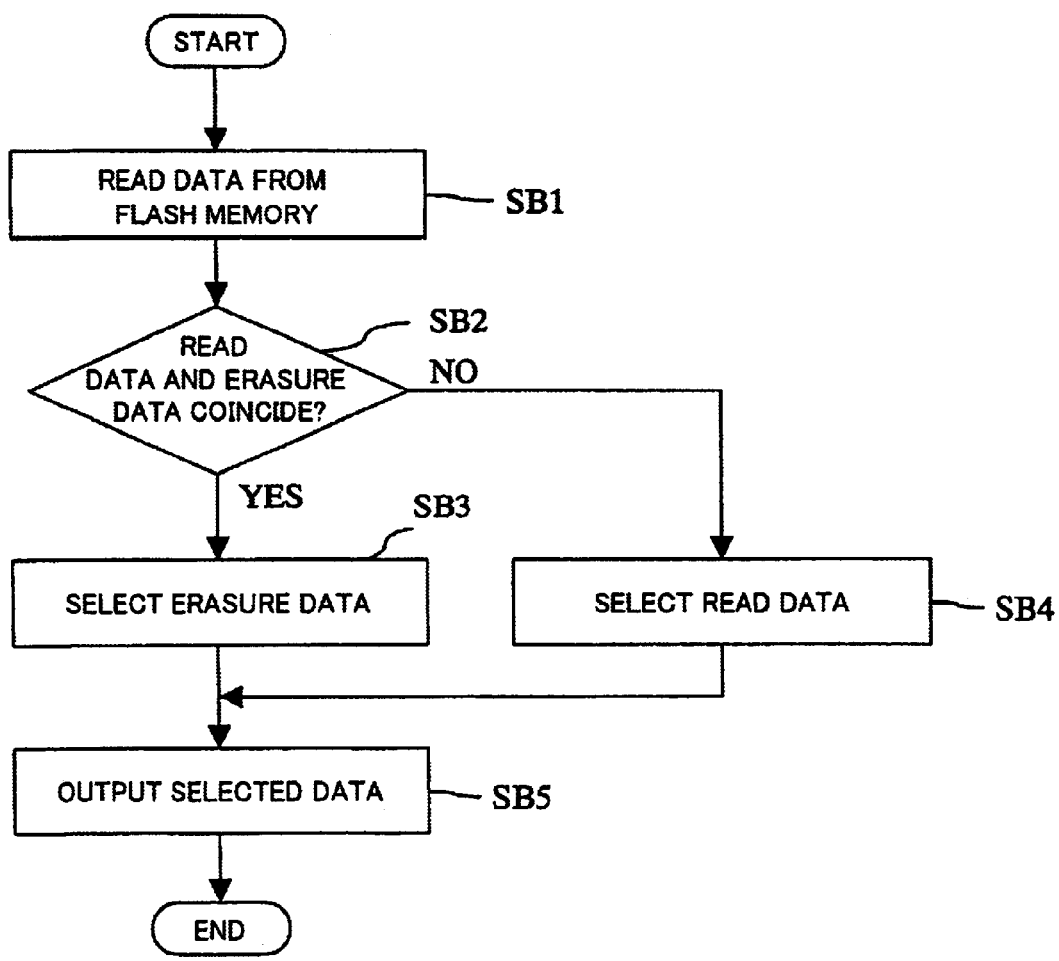
FIG. 7 is a flow chart of the operation at the time of reading.

Next, the entire operation of the error correction circuit 150 in the present embodiment will be explained. FIG. 6 and FIG. 7 are flow charts of the operations at the time of writing and at the time of reading the error correction circuit 150 in the present embodiment. Below, an explanation will be given of the operation of the error correction circuit 150 by referring to these flow charts and the circuit shown in FIG. 2.

First, an explanation will be given of the operation at the time of the writing by referring to FIG. 6.

Step SA1: The erasure data $D_E$ held in the erasure data register 40 is read and input to the coincidence detection circuit 50 together with the input write data $D_{in}$.

Step SA2: The coincidence detection circuit 50 compares 512 bytes of the user data in the input write data $D_{in}$ with the erasure data $D_E$ read from the erasure data register 40. As a result of the comparison, when the write data $D_{in}$ and the erasure data $D_E$ coincide, the routine proceeds to step SA3 to select the erasure data $D_E$ without selecting a parity bit computed by the ECC encoding circuit. Conversely, as a result of the above comparison, when the write data $D_{in}$ and the erasure data $D_E$ do not coincide, the routine proceeds to step SA4, where the write data $D_{in}$ after the error correction encoding is selected.

Step SA5: The selected data $D_W$ is written via the flash memory interface 170 into the flash memory 180.

Note that, in the comparison in the coincidence detection circuit 50, all bits of the write data $D_{in}$ and the erasure data $D_E$ are compared. As a result, when all bits coincide, a comparison signal $S_{CP}$ indicating the result of decision of coincidence is output, while if even 1 bit is different, a comparison signal $S_{CP}$ indicating the result of decision of noncoincidence is output.

Figure 8:
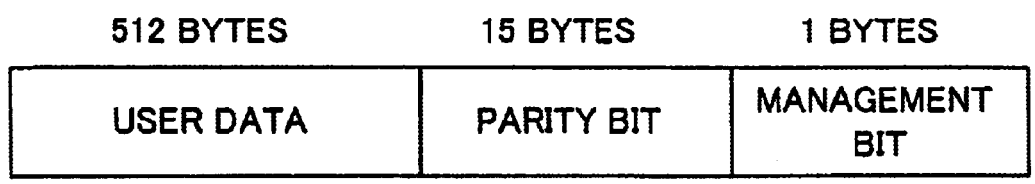
FIG. 8 is a diagram of an example of write data.

FIG. 8 shows an example of the write data $D_{in}$ stored in the nonvolatile memory. As illustrated, the write data $D_{in}$ is comprised by 512 bytes of the user data, 15 bytes of the parity bits, and one byte of the management bits. The parity bits are written with the result of the error correction encoding of the user data. The management bits are written with attribute information of the user data, for example, copyright information. Note that the management bits are not error correction encoded.

At the time of writing, the user data of the write data $D_{in}$ shown in FIG. 8 is input to the error correction circuit 150 in units of, for example, bytes. The erasure data register 40 of the error correction circuit 150 holds, for example, the erasure data $D_E$ in units of bytes. For this reason, the coincidence detection circuit 50 sequentially compares the user data $D_{in}$ and the erasure data $D_E$ input in units of bytes. As a result, when all bytes of the user data coincide with the erasure data $D_E$, the result of the error correction encoding is not employed in the parity bits, but the data the same as the erasure data is set. Then, all bytes of the user data and the parity bits are written into the flash memory 180 while keeping the erasure data $D_E$. The management bits are written with the write data $D_{in}$.

Conversely, as a result of the detection in the coincidence detection circuit, when data not coinciding with the erasure data $D_E$ is detected in the user data, based on the user data, the error correction code generated by the ECC encoding circuit 20 is set in the parity bits. Then, the parity bits and the management bits in which the user data and the error correction code are set are written into the flash memory 180.

Due to the above writing, when the user data is all erasure data $D_E$, the error correction code is not employed, but the data in the form of erasure data as it is, is written into the flash memory. Conversely, when data not coinciding with the erasure data is included in the user data, the parity bits and the management bits in which the user data and the error correction code generated in accordance with the user data are set are written into the flash memory 180.

Next, an explanation will be given of the operation at the time of reading by referring to FIG. 7.

Step SB1: Data $D_R$ is read from the flash memory 180. Note that, this read data $D_R$ includes the user data, parity data, and management data.

Step SB2: The read data $D_R$ and the erasure data $D_E$ acquired from the erasure data register 40 are sent to the coincidence detection circuit 50 and compared by the coincidence detection circuit. As a result of the comparison, when the read data $D_R$ and the erasure data $D_E$ coincide, the routine proceeds to step SB3, the decoding for the error detection and the error correction is not carried out, and the erasure data $D_E$ is selected as it is as the read data.

On the other hand, as a result of the comparison, when the read data $D_R$ and the erasure data $D_E$ do not coincide, the routine proceeds to step SB4, and the error detection is carried out with respect to the read data $D_R$. When there is error, the error is corrected based on the user data and the error correction code set in the parity bits. Then, the selection circuit selects the data after the error correction.

Step SB5: The data selected by the selection circuit 60 is output.

By the write and read operations explained above, when the 512 bytes of user data in the write data $D_{in}$ to be stored in the flash memory coincide with the erasure data $D_E$ in the erasure state of the flash memory, the results of the error correction encoding other than the management bits are not employed, and the user data and all data of the parity bits are set in the erasure data $D_E$ and written into the flash memory. Then, at the time of reading, when the user data and all data of the parity bits coincide with the erasure data $D_E$, the results of the error correction decoding other than the management bits are not employed, and the erasure data $D_E$ is output as the read data. Further, in this case, the error correction decoding is not necessary. By omitting the error correction decoding with its large processing load, the load of the processing circuit can be reduced and accompanying effects, such as, the reduction of consumption, can be obtained.

Summarizing the effects of the invention, as explained above, according to the present invention, there is provided a semiconductor memory device for error correction encoding and decoding the input/output data, wherein in accordance with the status data when the input data is in a predetermined state of the nonvolatile memory, for example, the erasure data in the erasure state, the encoded data obtained by the encoding processing or the erasure data is stored in the nonvolatile memory as it is and, at the time of reading, in accordance with the comparison result between the read data and the erasure data, the read data can be output as it is without decoding. Therefore, useless processing in writing and reading can be avoided and erroneous decisions in the error correction can be prevented. Further, using the read data, decoding having a large processing load can be omitted, so there are the advantages that reduction of the processing load and economization of the power consumption can be realized.

While the invention has been described with reference to specific embodiments chosen for purpose of illustration, it should be apparent that numerous modifications could be made thereto by those skilled in the art without departing from the basic concept and scope of the invention.

What is claimed is:

1. A semiconductor memory device comprising:
an encoding means for encoding input data according to a predetermined error correction encoding system;
a comparing means for comparing said input data and a predetermined status data;
a selecting means for selecting either of said predetermined status data or encoded data output from said encoding means in accordance with a comparison result of said comparing means; and
a nonvolatile memory for storing data selected by said selecting means,
wherein said nonvolatile memory holds said status data in a predetermined initialization state.

2. A semiconductor memory device as set forth in claim 1, wherein said nonvolatile memory holds said status data in an erasure state.

3. A semiconductor memory device as set forth in claim 1, wherein said selecting means selects said status data when said input data coincides with said status data and selects said encoded data output from said encoding means when said input data does not coincide with said status data.

4. A semiconductor memory device comprising:
a decoding means for decoding data read from a nonvolatile memory according to a predetermined error correction decoding system;
a comparing means for comparing data input to said decoding means and predetermined status data; and
a selecting means for selecting either of said status data or decoded data output from said decoding means in accordance with a comparison result of said comparing means,
wherein said nonvolatile memory holds said status data in a predetermined initialization state.

5. A semiconductor memory device as set forth in claim 4, wherein said selecting means selects said status data when said read data coincides with said status data and selects said decoded data when said read data does not coincide with said status data.

6. A semiconductor memory device for error correction encoding/decoding input/output data, comprising:
an encoding means for encoding input data according to a predetermined error correction encoding system;
a comparing means for comparing said input data and predetermined status data;
a first selecting means for selecting either of said input data or encoded data output from said encoding means in accordance with a comparison result of said comparing means;
a nonvolatile memory for storing data selected by said selecting means;
a decoding means for decoding data read from said nonvolatile memory according to a predetermined error correction decoding system;
the comparing means for comparing the decoded data input to said decoding means and said status data; and
a second selecting means for selecting either of said status data or said decoded data in accordance with the comparison result of said comparing means,
wherein said nonvolatile memory holds said status data in a predetermined initialization state.

7. A semiconductor memory device as set forth in claim 6, wherein said nonvolatile memory holds said status data in an erasure state.

* * * * *

UNITED STATES PATENT AND TRADEMARK OFFICE
CERTIFICATE OF CORRECTION

PATENT NO. : 6,847,554 B2
DATED : January 25, 2005
INVENTOR(S) : Satori

It is certified that error appears in the above-identified patent and that said Letters Patent is hereby corrected as shown below:

Column 10,
Line 39, "either of said input" should read -- either of said status --.
Line 48, "the decoded data" should read -- data --.

Signed and Sealed this

Sixteenth Day of August, 2005

JON W. DUDAS
*Director of the United States Patent and Trademark Office*